US006942913B2

United States Patent
Cediel et al.

(10) Patent No.: US 6,942,913 B2
(45) Date of Patent: Sep. 13, 2005

(54) MODULE FOR A MODULAR CONVEYOR BELT HAVING A MICROCELLULAR STRUCTURE

(75) Inventors: Luis Cediel, Wollerau (CH); Sergio Fandella, Mogliano Veneto-TV (IT)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 09/961,708

(22) Filed: Sep. 24, 2001

(65) Prior Publication Data

US 2003/0059567 A1 Mar. 27, 2003

(51) Int. Cl.[7] .............................. B32B 7/08; B32B 3/08; B32B 3/10; B32B 3/26
(52) U.S. Cl. .............................. 428/54; 428/52; 428/53; 428/304.4; 428/314.4; 428/308.4; 198/957
(58) Field of Search .............................. 428/54, 52, 53, 428/304.4, 314.4, 308.4; 198/957

(56) References Cited

U.S. PATENT DOCUMENTS

| | | | | |
|---|---|---|---|---|
| 3,882,191 A | * | 5/1975 | Balatoni et al. | ............ 525/125 |
| 3,929,026 A | * | 12/1975 | Hofmann | ..................... 198/847 |
| 4,043,958 A | * | 8/1977 | Whelan | ....................... 521/140 |
| 5,253,749 A | | 10/1993 | Ensch | ......................... 198/850 |
| 5,372,248 A | | 12/1994 | Horton | ........................ 198/852 |
| 5,377,819 A | * | 1/1995 | Horton et al. | .............. 198/853 |
| 5,706,934 A | * | 1/1998 | Palmaer et al. | ............. 198/853 |
| 6,017,586 A | * | 1/2000 | Payn et al. | ............... 427/372.2 |
| 6,169,122 B1 | | 1/2001 | Blizard et al. | |
| 6,231,942 B1 | | 5/2001 | Blizard et al. | |

FOREIGN PATENT DOCUMENTS

EP    0 068 475    1/1983

* cited by examiner

*Primary Examiner*—Harold Pyon
*Assistant Examiner*—Chris Bruenjes
(74) *Attorney, Agent, or Firm*—Hodgson Russ LLP (57) ABSTRACT

A module for a modular conveyor belt, is described. The module is of a micocellular polymeric foam produced by an injection molding process. The foam polymeric material exhibits excellent mechanical properties required for modular conveyor belts capable of withstanding long service lives. Also, the reduced weight in comparison to conventionally molded modules helps decrease wear on the conveyor belt support structures including the drive sprockets.

34 Claims, 4 Drawing Sheets

MODULE FOR A MODULAR CONVEYOR BELT HAVING A MICROCELLULAR STRUCTURE

BACKGROUND OF THE INVENTION

1. Field of the Invention

The present invention generally relates to conveyor belts and, more particularly, to modular conveyor belts formed of rows of plastic belt modules pivotally interlinked by transverse pivot rods. Preferably, the modules are of polymeric materials of microcellular foams including additives. Methods for the production of such modules are also described.

2. Prior Art

Because they do not corrode, are light weight, and are easy to clean, plastic modular conveyor belts are gaining increased usage in a wide range of industrial applications. Modular conveyor belts are built from molded plastic modular links, or modules, arranged side-by-side in rows of a selected width. A series of spaced apart link ends extending from each side of the modules include aligned openings that receive a pivot rod. The link ends along one end of a row of modules are interconnected with the link ends of an adjacent row. The pivot rod journaled in the aligned openings of the side-by-side and end-to-end connected modules form a hinge between adjacent rows. Rows of belt modules are connected together to form an endless conveyor belt capable of articulating about drive sprockets positioned at opposite ends of the conveying surface.

Modules for modular conveyor belts are typically formed of polyolefinic materials, for example, polypropylene or polyethylene. A modular conveyor belt system typically comprises a support frame upon which the conveyor belt rests as drive sprockets spaced at intervals along the belt length provide a motive force. A preferred material for modules is high density polyethylene having a density in excess of 0.94 g/cm$^3$. When the weight of the conveyor belt becomes too great, the drive sprockets and other support frame components, and even the belt modules themselves, experience excessive wear and must be replaced. Therefore, belt and support structure longevity can be an important factor in a customer deciding to continue using one manufacture over another.

In that light, the modules of the present invention are of polymeric foams having a plurality of voids, called cells, in the polymeric matrix. By replacing solid plastic with voids, such microcellular polymeric foams use less raw material than solid plastics for a given volume. The modules of the present invention comprising microcellular polymeric foams instead of solid plastics are less expensive in terms of material costs and are of a comparatively reduced weight. This latter attribute translates to a conveyor belt having a weight reduction of about 30% in comparison to a similarly sized belt of a solid polymeric material. A belt of reduced weight leads to prolonged module wear and prolonged conveyor belt support structure service.

SUMMARY OF THE INVENTION

The present invention provides a modular conveyor belt of modules comprised of a polymeric foam and, particularly, a microcellular polymeric foam, including a nucleating agent and a blowing agent. The microcellular foam is produced by an injection molding process and the resulting modules exhibit excellent mechanical properties required for modular conveyor belts capable of extended duty.

One embodiment of the present invention provides a method for forming a module for a modular conveyor belt, the module comprising a microcellular polymeric material. The method includes conveying a polymeric mixture through a polymer processing apparatus. The polymeric mixture comprises a semi-crystalline polymer and a nucleating agent present in an amount of about 2.5% to about 7%, by weight, of the polymeric material. At these concentrations, the nucleating agent effectively functions as a filler replacing solid polymeric material in a non-negligible amount.

In another embodiment of the present invention, the manufacturing process further includes introducing a blowing agent into the polymeric material as it moves through the polymer processing apparatus. The blowing agent is preferably present in an amount of about 0.1% to about 7%, by weight, of the polymeric material. The resulting module of a semi-crystalline polymer provided with the nucleating agent and blowing agent incorporated therein is of a microcellular structure having an average cell size of about 60 microns. This results in a considerable cost savings attributed to the microcellular structure replacing solid polymeric material without detracting from the mechanical strength of the module. In still a further embodiment, the present invention includes the step of introducing a pressure drop rate of less than 1.0 GPa/s as the mixture of the nucleating agent/blowing agent and polymeric material moves through the polymer processing apparatus.

In that respect, certain advantages of the present invention include producing modules for a modular conveyor belt with the modules being formed of a microcellular polymeric foam with low blowing agent percentages and/or low pressure drop rates due to the presence of the nucleating agent. Using low blowing agent percentages results in cost savings associated with the blowing agent and also may improve the surface quality of the resulting modules. Employing low pressure drop rates as opposed to high pressure drop rates generally permits greater freedom in module design and, in some cases, allows for the production of modules having thicker cross-sectional dimensions.

In many cases the microcellular foams have uniform and fine cell structures despite the presence of the nucleating agent and the blowing agent. The interconnectivity between cells is generally minimal, and the foams can be produced over a range of densities. In particular, relatively high density foams can be produced having properties comparable to solid, unfoamed plastics.

These and other aspects of the present invention will become increasingly more apparent to those skilled in the art by reference to the following description and the appended drawings.

DETAILED DESCRIPTION OF THE PREFERRED EMBODIMENTS

The various embodiments and aspects of the present invention will be better understood from the following definitions. As used herein, "nucleation" defines a process by which a homogeneous, single-phase solution of polymeric material, in which is dissolved molecules of a species that is a gas under ambient conditions, undergoes formations of clusters of molecules of the species that define "nucleation sites", from which cells will grow. That is, "nucleation" means a change from a homogeneous, single-phase solution to a multi-phase mixture in which, throughout the polymeric material, sites of aggregation of at least several molecules of blowing agent are formed. Thus "nucleation sites" do not define locations, within a polymer, at which nucleating agent particles reside. "Nucleated" refers to a state of a fluid polymeric material that had contained a single-phase, homogeneous solution including a dissolved species that is a gas under ambient conditions, but, following a nucleating event (typically thermodynamic instability) contains nucleation sites. "Non-nucleated" refers to a state defined by a homogeneous, single-phase solution of polymeric material and dissolved species that is a gas under ambient conditions, absent nucleation sites. A "non-nucleated" material can include a nucleating agent such as talc.

A "nucleating agent" is a dispersed agent, such as talc or other filler particles, added to a polymer and able to promote formation of nucleation sites from a single-phase, homogenous solution. A "filler" is a dispersed particle added to replace solid polymeric material.

The term "blowing agent" describes two basic types of materials—those which are "physical blowing agents" and those which are "chemical blowing agents". Physical blowing agents are liquids with boiling points below the softening points of the polymeric resins used. Chemical blowing agents are substances that decompose over a narrow temperature range to produce gases.

A suitable physical blowing agent for use in constructing conveyor belt modules according to the present invention must have the following properties: a relatively high solubility in the resin without drastic change of the resin's viscosity or glass transition point, low diffusion tendencies, and fast vaporization during expansion to achieve low residual gas concentration in the polymeric cell wall.

The main criteria for a suitable chemical blowing agent is that the temperature of decomposition lie within the processing temperature range of the polymeric resin. In addition, the rate of decomposition to gaseous products must not be too slow. It is also advantageous that the following conditions be fulfilled: the products of decomposition must not discolor the polymeric resin, the products of decomposition must not be corrosive, and the products of decomposition themselves should act as nucleating agents.

One embodiment of the present invention provides a module for a modular conveyor belt, the module being of a semi-crystalline microcellular foam having a nucleating agent incorporated therein. The foam includes from about 2.5% to about 7%, by weight, of the nucleating agent. A more preferred range of the nucleating agent is about 3% to about 7%, and still more preferably, about 5% to about 7%, by weight. Suitable nucleating agents include a variety of inorganic solids such as talc, calcium carbonate ($CaCO_3$), titanium oxide ($TiO_2$), barium sulfate ($BaSO_4$), zinc sulfide (ZnS), and mixtures thereof. Organic solids such as the cellulosic fibers may also function as nucleating agents. In some cases, the nucleating agents may also enhance electrical conductivity, enhance crystallinity, function as a pigment, and serve as a flame retardant.

Typically, the nucleating agents are particles, though in some cases they may be fibrous or have other forms. The nucleating particles can have a variety of shapes such as spherical, cylindrical, or planar. Generally, the particles have a size in the range of about 0.01 microns to about 10 microns, and more typically about 0.1 microns to about 1.0 microns. In some embodiments, the particles may be surface treated with a surfactant to enhance dispersibility within the polymeric melt and to prevent particle agglomeration.

The present modules of a microcellular foam are composed, at least in part, of any semi-crystalline polymeric resin including, but not limited to, the following materials: polyethylene terephthalate (PET), polylactic acid, nylon 6, nylon 6/6, polyethylene, polypropylene, syndiotactic polystyrene, polyacetal, and mixtures thereof. In certain cases, the semi-crystalline polymer may be blended with non-semicrystalline polymers. In preferred cases, the semi-crystalline resin is a polyolefinic material such as high-density polyethylene having a density of greater than about 0.94 g/cm$^3$. In preferred cases, the weight percentage of high-density polyethylene is greater than 80% of the polymeric material, and more preferably greater than 90%. In a particularly preferred case the polymeric material consists essentially of high density polyethylene, that is, there is no other polymeric resin components other than high-density polyethylene.

Optionally, the foam polymeric mixture may include other additives in addition to the nucleating agent. These include additives such as plasticizers (e.g., low-molecular weight organic compounds), lubricants, flow enhancers, anti-oxidants, and mixtures thereof.

According to another embodiment of the present invention, a physical or a chemical blowing agent is introduced into the molten polymeric resin. Suitable physical blowing agents include fluoro-chlorinated hydrocarbons, aliphatic hydrocarbons, nitrogen and carbon dioxide. There are many fluoro-chlorinated hydrocarbons sold under the various trade name: FRIGEN, KALTRON, FREON, and FLUGENE. For foamed PS and PVC, trichlorofluoromethane ($CCl_3F$) called R11, or dichlorodifluoromethane ($CCl_2F_2$) called R12, or a 50:50 mixture of them is used. For foaming of polyolefins, FREON R114 is preferred. Isopentane and n-pentane are also suitable blowing agents, even though they are flammable and form explosive mixtures with air.

Azodicarbonamide (ADC) is the most preferred chemical blowing agent. The best gas yield of about 220 cm$^3$/g is achieved at a temperature of about 210° C. This blowing agent decomposes into solid and nitrogen. The temperature of decomposition, however, is too high for several of the temperature sensitive thermoplastic resins. The decomposition temperature can be reduced by the addition of initiators (metal compounds such as zinc oxide and zinc stearate). Other suitable chemical blowing agents and their properties are listed below in Table 1.

TABLE 1

| Blowing Agent | Short nomenclature | Processing temp. range °C. | Gas yield cm³/g | Concentration % | Used with |
|---|---|---|---|---|---|
| Azodicarbonamide (Azobisformamide) | ADC | 165 to 215 | 220 (210° C.) | 0.1 to 4.0 | PP, PS, ABS, PE (hard), PVC |
| Azodiisobutyronitrile | AZDN | 110 to 125 | 130 (110° C.) | 0.5 to 6.0 | PVC |
| p,p-oxibis (benzol-sulphonhydrazine) | OBSH | 150 to 200 | 160 (160° C.) | 0.5 to 2.0 | PE (soft), EVA |
| Trihydrazinotriazine | THT | 250 to 300 | 220 (270° C.) | 0.1 to 1.0 | PA, AC |
| Barium-azodicarbonate | BADC | 250 to 300 | 200 (270° C.) | 0.1 to 1.0 | PVC, PA, PC, ABS |
| p-toluenesulfonyl semicarbazide | TSSC | 180 to 210 | 200 (200° C. | 0.5 to 2.0 | PE (hard), PP, PS, PVC) |

Other chemical blowing agents useful with the present invention include azobisisobutyronitrile, diazoaminobenzene, N,N'-dimethyl-N,N'-dinitrosoterephthalamide, N,N'-dinitrosopentamethylenetetramine, benzenesulfonyl hydrazide, toluene-(4)-sulfonyl hydrazide, benzene-1,3-disulfonyl hydrazide, diphenylsulfon-3,3'-disulfonyl hydrazide, and 4,4'-oxybis(benzenesulfonyl hydrazide).

Even though in some cases the amount of nucleating agent and/or blowing agent is greater than about 2.5 weight percent, the polymeric foams have a relatively uniform and fine cell structure. Conveyor belt modules of a foam polymeric material according to the present invention have an average cell size of less than about 60 microns, preferably less than about 50 microns, more preferably less than about 20 microns, and more preferably still less than about 5 microns. The microcellular material preferably has a maximum cell size of about 100 microns.

Preferably, the cell structure of the microcellular foam material comprising the modules of the present invention is a closed cell structure. A substantially closed cell structure has limited interconnection between adjacent cells and, generally, is meant to define a polymeric material that, at a thickness of about 200 microns, contains no connected cell pathway through the material. It is believed that the closed cell structure advantageously contributes to enhancing the mechanical properties of the foam due to the absence of long interconnected pathways which could act as sites for premature failure of the conveyor belt modules.

Microcellular polymeric foams comprising the modules of the present invention can be produced over a wide range of densities. In a particularly preferred embodiment, the microcellular foam has a void volume from about 10% to about 50%. Foams within this preferred void volume range exhibit excellent mechanical properties such as tensile strength and tensile modulus while still having a significant density reduction from that of solid plastic.

Another attribute of the present invention is that the microcellular polymeric foams provide the conveyor belt modules with a desirable surface quality because they are produced with low blowing agent percentages, thus limiting the amount of gas that diffuses through the foam surface. As is known in the field of microcellular foam processing, gas diffusion through the module surface generally leads to surface roughness and imperfections.

Figures 1, 2:
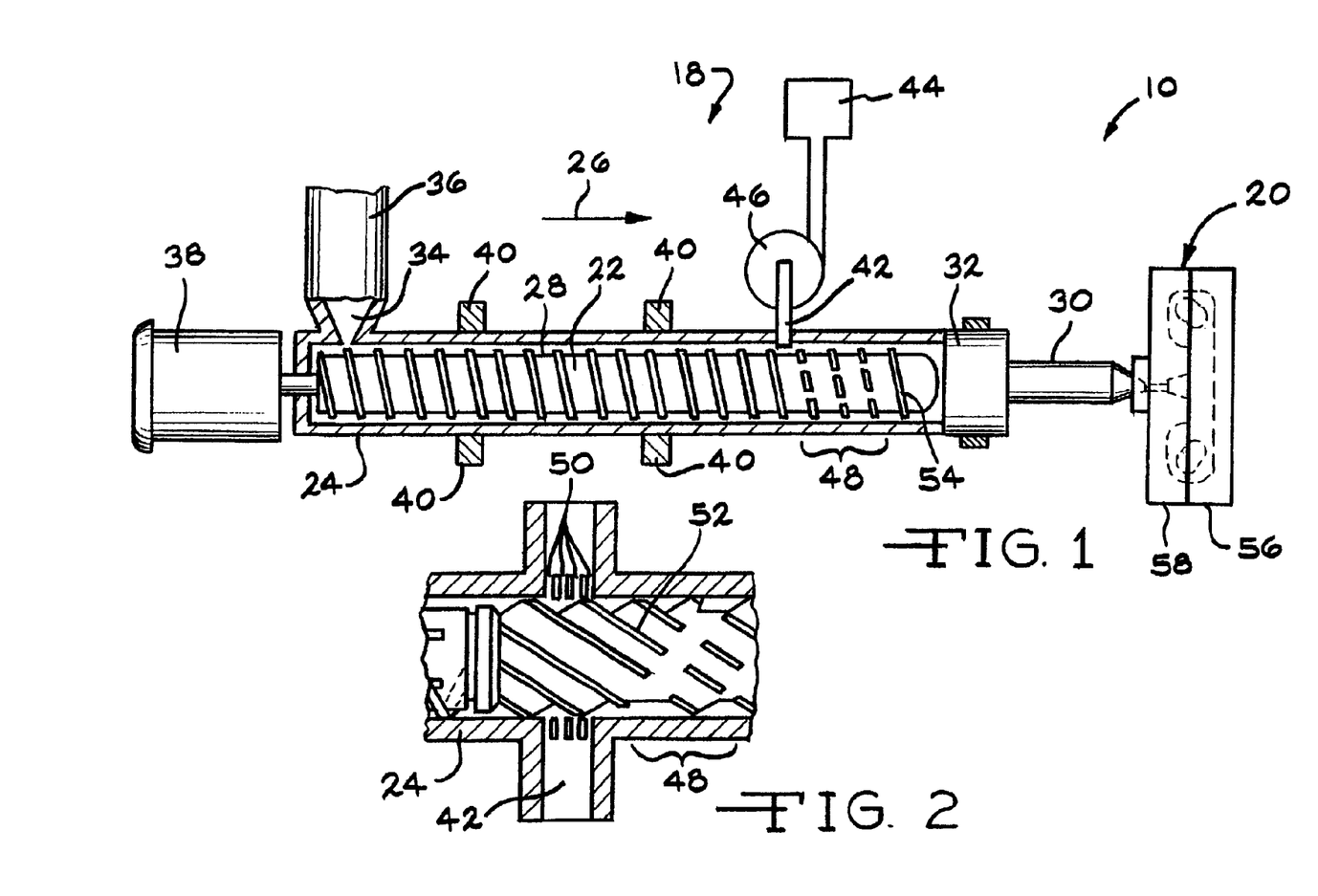
FIG. 1 is a schematic, partly in cross-section, showing an extrusion system for producing conveyor belt modules of a microcellular polymeric material according to the present invention.
FIG. 2 is a schematic, partly in cross-section, showing a multihole blowing agent feed orifice arrangement and extrusion screw.

Referring now to the drawings, FIG. 1 shows an injection molding system 10 for the production of modules 12 and 14 (FIGS. 3 to 6) of a microcellular polymeric foam 16. The microcellular polymeric foam 16 includes a nucleating agent in a range of about 2.5% to about 7%, by weight, and/or a chemical blowing agent in a range of about 0.1% to about 7%, by weight. The injection system 10 comprises an injection molding apparatus 18 for injecting the microcellular polymeric foam 16 into a mold 20. The injection molding apparatus 18 comprises a screw 22 that rotates within a barrel 24 to convey, in a downstream direction (arrow 26), a polymeric material in a processing space 28 between the screw and the barrel. The polymeric material is injected into the mold 20 through an injection conduit 30 fluidly connected to the processing space 28 and fixed to a metering section 32 at a downstream end of the injection barrel 24.

Typically, the polymeric material is gravity fed into polymer processing space 28 through orifice 34 from a standard hopper 36. The polymeric material is preferably in a pelletized form. Though the polymeric material can include a variety of semi-crystalline materials or blends thereof, preferably the polymeric material includes a polyolefin such as polypropylene and medium or high-density polyethylene.

In some cases, the nucleating agent or the chemical blowing agent, or both, are added in a concentrate pellet form, for example 40% by weight, blended with the semi-crystalline polymer pellets as a master batch. The concentrated pellets are blended with suitable amounts of semi-crystalline pellets to produce a polymeric material having between about 2.5% and about 7%, by weight, of the nucleating agent, and/or about 0.1% to about 7%, by weight, of the chemical blowing agent. In that manner, the percentage of, for example talc, in the polymeric material composition is adjusted by controlling the ratio of the nucleating agent concentration to that of the pure polymer pellets. In other embodiments, the nucleating agent and/or chemical blowing agent in particulate form is added directly to the polymeric material. Any other techniques well known in the art may also be employed for incorporating the nucleating agent and/or the chemical blowing agent into the polymer composition in controllable amounts.

Injection screw 22 is operably connected at its upstream end to a drive motor 38 which rotates the screw. Although not shown in detail, injection screw 22 includes feed, transition, gas injection, mixing, and metering sections, as described further below.

Temperature control units 40 are optionally positioned along injection barrel 24. Control units 40 can be electrical heaters, can include passageways for temperature control fluid, and the like and are used to heat the stream of pelletized or fluid polymeric material within the injection barrel. This helps to facilitate melting or effecting cooling the polymeric stream to control viscosity, skin formation and, in some cases, blowing agent solubility. The temperature control units 40 operate differently at different locations along the barrel. That is, they may heat at one or more locations and cool at one or more different locations. Any number of temperature control units can be provided.

From hopper 36 pellets are received into the feed section of screw 22 and conveyed in the downstream direction 26 in polymer processing space 28 as the screw rotates. Heat from injection barrel 24 and the shear forces arising from the rotating screw act to soften the pellets within the transition section. Typically, by the end of the first mixing section the softened pellets have been gelated, that is welded together to form a uniform fluid stream substantially free of air pockets.

The physical blowing agent is introduced into the polymer stream through a port 42 in fluid communication with a source 44 thereof. The port is positioned to introduce the physical blowing agent at any of a number of locations along the injection barrel 24. Preferably, as discussed further below, the port 42 introduces the physical blowing agent at the gas injection section of the screw, where the screw includes multiple fights.

A pressure and metering device 46 is provided between the physical blowing agent source 44 and port 42. Blowing agents that are in the supercritical fluid state in the extruder are especially preferred, in particular supercritical carbon dioxide and supercritical nitrogen.

Metering device 46 is used to meter the amount of the physical blowing agent introduced into the polymeric stream within the injection barrel 24. In a preferred embodiment, metering device 46 measures the mass flow rate of the physical blowing agent. The physical blowing agent is generally less than about 15% by weight of the polymeric stream and blowing agent. The presence of the previously introduced nucleating agent is believed to enhance the driving force for nucleation thus enabling the production of a microcellular foam at low blowing agent percentages, for example about 0.1% to about 2.5% blowing agent by weight of the polymeric stream and blowing agent. This attribute of the nucleating agent applies for both chemical and physical blowing agents.

FIG. 2 is an enlarged view showing a preferred embodiment of two physical blowing agent ports on opposite top and bottom sides of the injection barrel 24. In this preferred embodiment, port 42 is located in the gas injection section of the screw at a region upstream from mixing section 48 of screw 22 (including highly-broken flights) by no more than about four full flights, and preferably no more than about one full flight. Positioned as such, the injected physical blowing agent is rapidly and evenly mixed into the fluid polymeric stream to promote production of a single-phase solution of the foamed material precursor and the physical blowing agent.

Physical blowing agent port 42 is a multi-hole port including a plurality of orifices 50 connecting the blowing agent 44 source with the injection barrel 24. Preferably, a plurality of ports 42 are provided about the injection barrel 24 at various positions radially and longitudinally aligned with each other. For example, a plurality of ports 42 are placed at the 12 o'clock, 3 o'clock, 6 o'clock and 9 o'clock positions about the injection barrel, each including multiple orifices 50. Where each orifice 50 is considered a physical blowing agent orifice, the present invention includes an injection molding apparatus having at least about 10, preferably at least about 100, more preferably at least about 500, and more preferably still at least about 700 blowing agent orifices in fluid flow communication between the barrel 24 and the source 44 of the blowing agent.

Also, the orifice or orifices are adjacent full, unbroken flights 52. As the screw rotates, each unbroken flight 52 periodically passes or "wipes" each orifice 50. This wiping increases rapid mixing of the physical blowing agent and the fluid foamed polymeric precursor by essentially rapidly opening and then closing each orifice periodically blocked by the flight 52 in alignment therewith. The result is a distribution of relatively finely-divided, isolated regions of physical blowing agent in the fluid polymeric material immediately upon injection and prior to any mixing. In this arrangement, at a standard screw revolution speed of about 30 rpm, each orifice 50 is passed by a flight 52 at a rate of at least about 0.5 passes per second to about two passes per second. In preferred embodiments, orifices 50 are positioned at a distance of from about 15 to about 30 barrel diameters from the beginning of the screw at its upstream end, adjacent to drive motor 38.

Referring again to FIG. 1, the mixing section 48 of screw 22, following the gas injection port 42, is constructed to mix the physical blowing agent and polymer stream to promote formation of a single phase solution of blowing agent and polymer, including the nucleating agent, if used. The mixing section 48 includes unbroken flights 54 which break up the stream to encourage mixing. Downstream from the mixing section, the metering section 32 builds pressure in the polymer-blowing agent stream prior to injection conduit 30 connected to mold 20.

Figure 3:
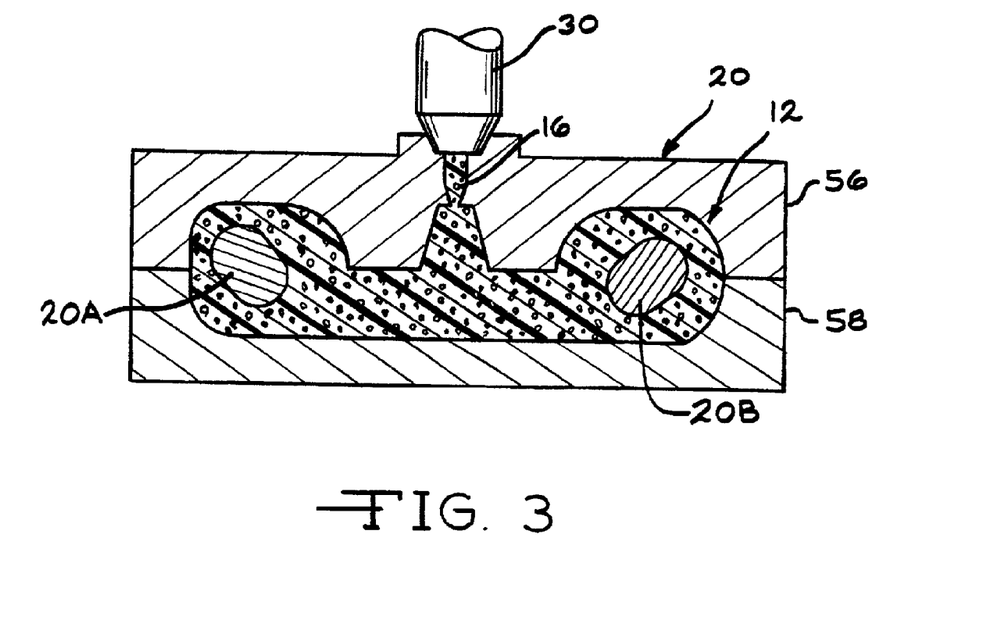
FIG. 3 is a cross-sectioned view of a mold for producing a conveyor belt module of a microcellular polymeric foam according to the present invention.

As shown in FIG. 3, mold 20 includes mating first and second mold halves 56 and 58 forming a cavity, for example of the shape of the exemplary flat top module 12, connected to injection conduit 30 through which the polymer stream flows from the polymer processing space 28. In a broader sense, however, mold 20 can have any variety of module configurations including flat top modules, flush grid modules, raised rib modules and radius modules, as is well known in the art. Mold 20 further has rods 20A and 20B to provide the module with openings in its link ends. This will be described in detail hereinafter.

The metering section 32 may also perform the function of nucleating the polymer and blowing agent, whether it be of the chemical or the physical type, into a single-phase solution. The pressure in the single phase solution drops as the polymeric mixture flows through the metering section 32. This pressure drop causes the solubility of the blowing agent in the polymer to decrease, which is the driving force for the cell nucleation process. Typically, the metering section 32 is designed to provide a pressure drop suitable for cell nucleation in accordance to microcellular foam requirements. Under processing conditions, the pressure drop across the metering section 32 is generally greater than 1,000 psi, preferably greater than 2,000 psi, and more preferably greater than 3,000 psi.

In some embodiments, the metering section 32 is also configured, as known in the art, to provide a pressure drop rate (dP/dt) as the single-phase solution flows there through. Pressure drop rates also effect the cell nucleation process. Typically, a sufficient pressure drop rate must be induced to achieve appropriate nucleation conditions for microcellular polymeric materials. The presence of the nucleating agent at an amount of from about 2.5% to about 7%, by weight, is believed to lower the pressure drop rate required. In certain cases, it is desirable to use a process that employs low pressure drop rates. Generally, lower pressure drop rates allow for more freedom in mold construction and the resulting conveyor belt module dimensions. In certain embodiments, the pressure drop rate in the solution is less than 1.0 GPa/s, in some embodiments less than 0.10 GPa/s, and, in other embodiments less than 0.05 GPa/s. In still other embodiments higher pressure drop rates are utilized, for example greater than about 10.0 GPa/s.

As a result of elevated temperatures, the microcellular polymeric foam is typically soft enough so that the nucleated cells grow. As the foam cools in the mold and becomes more solid, however, cell growth is restricted. In certain embodiments, it is advantageous to provide external cooling means such as cooling air or water to speed the cooling rate of the foam.

Now that the injection molding system 10 has been described in detail, the exemplary flat top module 12 and the exemplary radius module 14 of the present invention will be described. More particularly, the modules 12 and 14 are manufactured by the injection molding system 10 shown in FIGS. 1 and 2 and are of a polymeric material comprising a microcellular foam.

Figure 4:
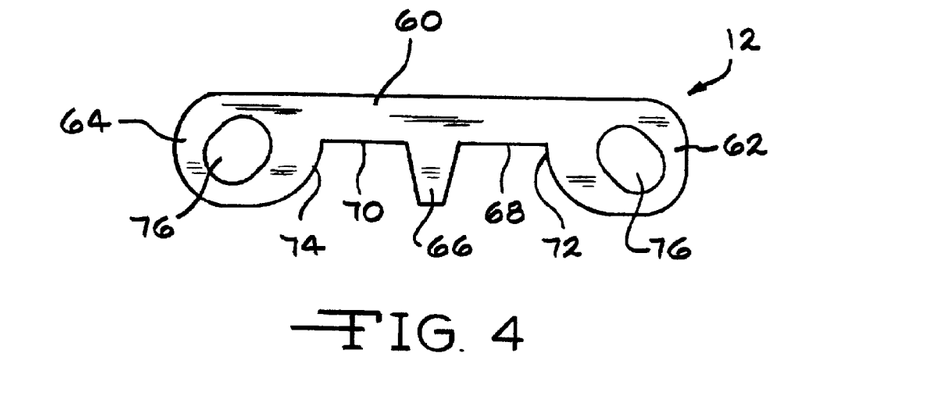
FIG. 4 is a side elevational view of an exemplary flat top module according to the present invention.
Figure 5:
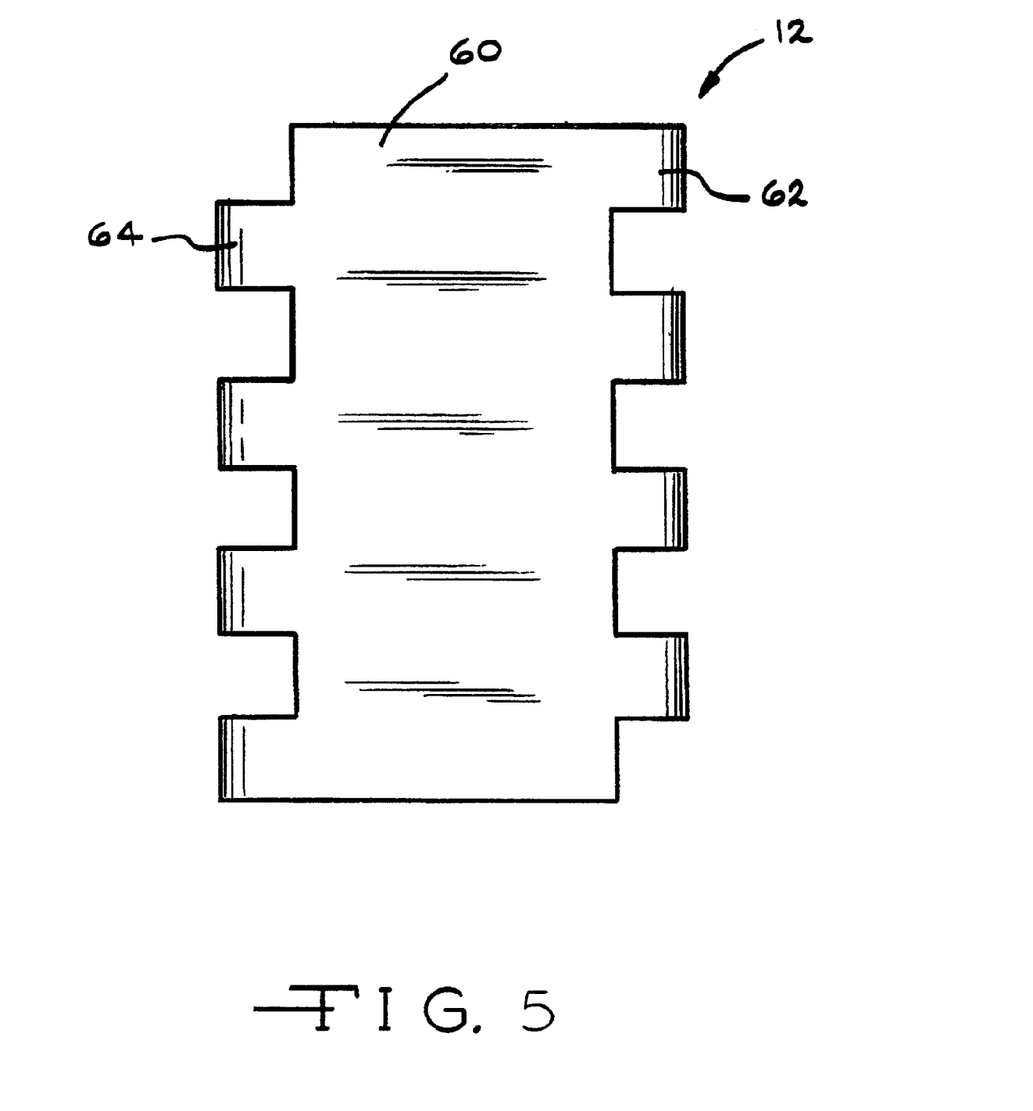
FIG. 5 is a plan view of the flat top module shown in FIG. 4.

The flat top module 12 includes a generally rectangular plate-like body 60 having a first plurality of link ends 62 and a second plurality of link ends 64 extending in opposite directions therefrom. A transverse rib 66 extends across the width of the underside of the body 60 to form opposed channels 68 and 70 terminating at respective edges 72 and 74 from which the respective link ends 62 and 64 project. The rib 66 and the inside of the link ends 62, 64 are adapted to mate with corresponding sprocket teeth of a sprocket wheel (not shown) to impart a driving force to a conveyor belt formed by the interconnected modules 12. The under structure of the module 12 formed by the transverse rib 66 serves to strengthen the module and to prevent any significant binding of the module 10 about its longitudinal or transverse axes.

The link ends 62 and 64 circumscribe corresponding aligned cylindrically shaped openings 76. The openings 76 receive pivot pins or rods (not shown) adapted to pivotally connect a plurality of the modules 12 in an end to end configuration while laterally aligning adjacent modules to form a modular conveyor belt (not shown). Preferably, the modules 12 are of link end configuration to be end-to-end reversible. In other words, either end of a module can mate with either end of any other link module.

Figure 6:
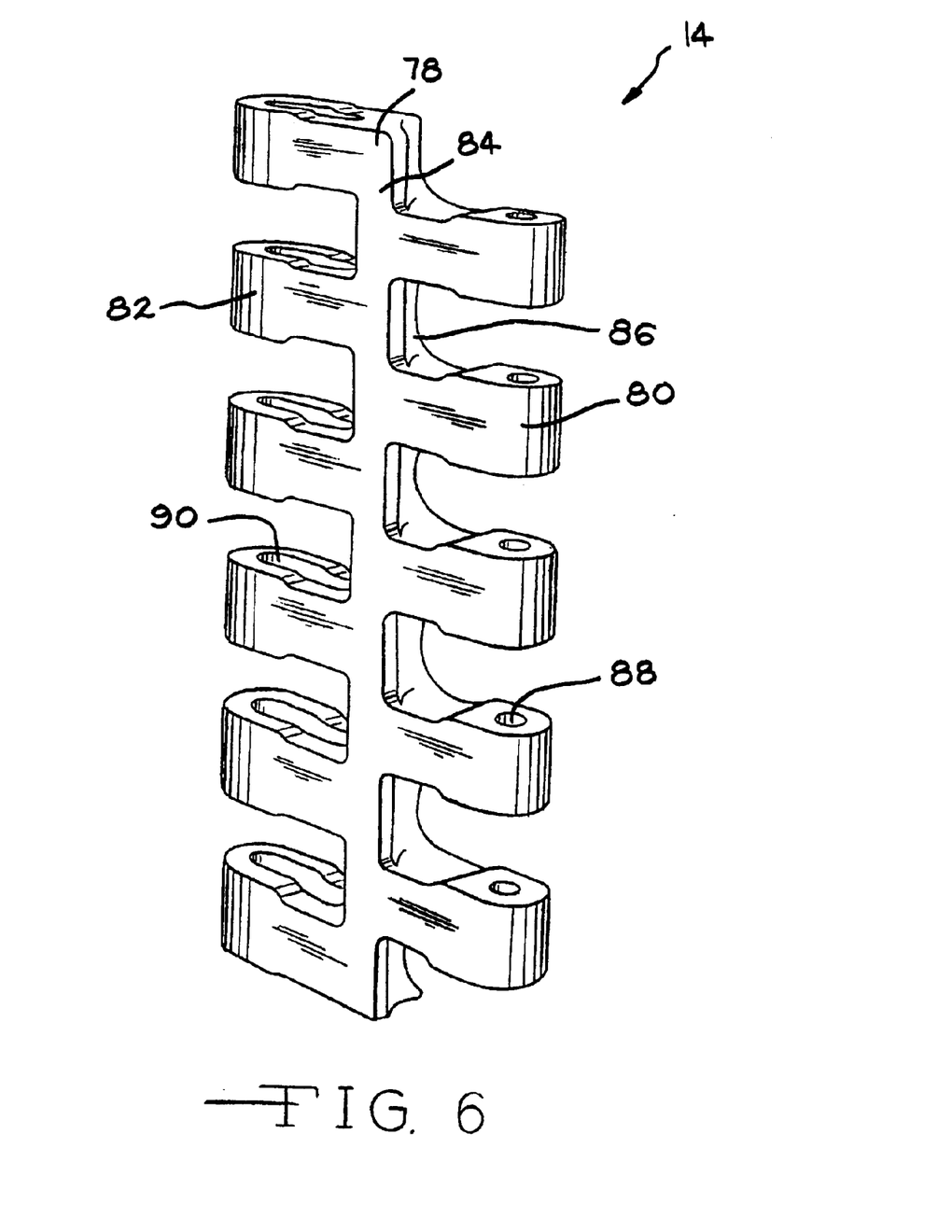
FIG. 6 is a perspective of a radius module of a microcellular polymeric foam according to the present invention.

FIG. 6 shows another embodiment of a module, in this case a radius module 14, comprised of a microcellular polymeric foam. The module 14 is referred to as a radius module because, as will be described in detail below, it is adapted for construction of conveyor belts that are capable of traveling around a radius turn. The module 14 further has an intermediate section 78 supporting a plurality of first link ends 80 and a plurality of second link ends 82. The first link ends 80 are disposed in the direction of belt travel and the plurality of second link ends 82 extend opposite the first link ends 80. The intermediate section 78 is comprised of an upper, transverse stiffening web 84 forming into a lower corrugated portion 86 (only partially shown in the drawing) having a sinusoidal shape. Along with the transverse web 84 of the intermediate section 78, the ridges (not shown) of the sinusoidal shape extending toward the right of FIG. 6 support the first link ends 80 while the ridges (not shown) of the sinusoidal shape extending toward the left in the drawing support the second link ends 82.

Module 14 further includes generally cylindrically-shaped pivot rod openings 88 in link ends 80. Similarly, oblong slots 90 are disposed through the link ends 82 transverse to the direction of belt travel. With a plurality of modules 14 forming a conveyor belt, a pivot rod (not shown) passes through the openings 88 in the first link ends 80 and through the slots 90 in the second link ends 82. The pivot rod preferably cannot move in the direction of belt travel inside the openings 88. However, due to the oblong shape of slots 90 the pivot rod pivots inside of them. This enables a conveyor belt constructed of a plurality of the modules 14 to travel around a radius turn by collapsing on one side while the other side fans out due to the pivoting of the pivot rod in the oblong slots 90. For a more detailed description of a radius module, reference is made to U.S. application Ser. No. 09/579,090, filed May 25, 2000, which is assigned to the assignee of the present invention, and incorporated herein by reference.

It is further contemplated by the scope of the present invention that the microcellular polymeric foam material comprising the exemplary flat top module 12 and the exemplary radius module 14 may include additives such as those that enhance electrical conductivity (carbon black and graphite particle fillers), flame retardants and pigments. These additives are preferably provided in the polymeric material in a concentration of about 0.15% to about 10.5%, by weight.

While the present invention has been described with respect to an exemplary flat top module 12 and a radius module 14, that is by way of example only. Those skilled in the modular belt arts will readily recognize that the present injection molding process can be used to manufacture a variety of modules including flush grid modules, raised rib modules and flight modules as well as various accessories for modular conveyor belts such as sprockets, pivot rods, side guards, finger boards, and the like. In short, the injection molding process of the present invention can be used to manufacture any component for a modular conveyor belt where it is desired to have a microcellular polymeric foam comprising the component.

It is intended that the foregoing description be only illustrative of the present invention and that the present invention be only limited by the hereinafter appended claims.

What is claimed is:

1. A modular conveyor belt, which comprises:
   a) a plurality of modules, each module comprised of a first plurality of link ends, a second plurality of link ends and an intermediate section integrally formed with and joining the first and second plurality of link ends, wherein the link ends of each of the modules are releasably engaged between link ends of an adjacent module except for individual link ends of modules disposed at the extreme sides of the belt and wherein at least some of the modules comprise a polymeric material including a plurality of cells having an average cell size of less than 100 microns and at least some of the modules include a nucleating agent; and
   b) a pivot rod pivotally connecting the modules at engaged link ends.

2. The conveyor belt of claim 1 wherein the average cell size is less than about 60 microns.

3. The conveyor belt of claim 1 wherein the average cell size is less than about 20 microns.

4. The conveyor belt of claim 1 having a void volume of greater than 10%.

5. The conveyor belt of claim 1 having a void volume of from about 10% to about 50%.

6. The conveyor belt of claim 1 wherein the polymeric material is selected from the group consisting of polyethylene terephthalate, polylactic acid, nylon 6, nylon 6/6, polyethylene, polypropylene, syndiotactic polystyrene, polyacetal, and mixtures thereof.

7. The conveyor belt of claim 1 wherein the polymeric material comprises at least about 80% of one of the group selected from polypropylene, medium density polyethylene, and high-density polyethylene, by weight, of the polymeric material.

8. The conveyor belt of claim 1 wherein the polymeric material comprises from about 2.5% to about 7% of a nucleating agent, by weight, of the polymeric material.

9. The conveyor belt of claim 1 wherein the nucleating agent comprises an inorganic solid.

10. The conveyor belt of claim 1 wherein the nucleating agent is selected from the group consisting of talc, calcium carbonate, titanium oxide, barium sulfate, zinc sulfide, cellulosic fibers, and mixtures thereof.

11. The conveyor belt of claim 1 wherein the cells are characterized as having been formed by introducing a blowing agent into the polymeric material.

12. The conveyor belt of claim 11 wherein the blowing agent is either a chemical blowing agent or a physical blowing agent.

13. The conveyor belt of claim 12 wherein the physical blowing agent is selected from the group consisting of dichlorotetrafluoroethane, iso-pentane, n-pentane, trichlorofluoromethane, dichlorodifluoromethane, carbon dioxide, nitrogen, and mixtures thereof.

14. The conveyor belt of claim 12 wherein the chemical blowing agent is selected from the group consisting of azodicarbonamide, azodiisobutyronitrile, p,p-oxibis, trihydrazinotriazine, barium-azodicarbonate, p-toluenesulfonyl semicarbazide, azobisisobutyronitrile, diazoaminobenzene, N,N'-dimethyl-N,N'-dinitrosoterephthalamide, N,N'-dinitrosopentamethylenetetramine, benzenesulfonyl hydrazide, toluene-(4)-sulfonyl hydrazide, benzene-1,3-disulfonyl hydrazide, diphenylsulfon-3,3'-disulfonyl hydrazide, 4,4'-oxybis(benzenesulfonyl hydrazide), and mixtures thereof.

15. The conveyor belt of claim 12 wherein the polymeric material is essentially free of residual physical blowing agent and chemical blowing agent and reaction-by-products of the physical blowing agent and the chemical blowing agent.

16. The conveyor belt of claim 1 wherein the cells are primarily closed cells.

17. The conveyor belt of claim 1 wherein the polymeric material includes an additive material selected from the group consisting of an antimicrobial material, an electrical conductivity material, a flame retardant, a pigment, and mixtures thereof.

18. The conveyor belt of claim 17 wherein the additive material is present in the polymeric material in an amount of about 0.15% to about 10.5%, by weight.

19. The conveyor belt of claim 1 wherein the modules are selected from the group consisting of flat top modules, radius modules, flush grid modules, raised rib modules, and flight modules.

20. A modular conveyor belt, which comprises:
   a) a plurality of modules, each module comprised of a first plurality of link ends, a second plurality of link ends and an intermediate section integrally formed with and joining the first and second plurality of link ends, wherein the link ends of each of the modules are releasably engaged between link ends of an adjacent module except for individual link ends of modules disposed at the extreme sides of the belt;
   b) a polymeric material comprising at least some of the modules including a nucleating agent in an amount between about 2.5% and about 7%, by weight, of the polymeric material; and
   c) a pivot rod pivotally connecting the modules at engaged link ends to thereby form the modular conveyor belt.

21. The modular conveyor belt of claim 20 wherein the nucleating agent is selected from the group consisting of talc, calcium carbonate, titanium oxide, barium sulfate, zinc sulfide, cellulosic fibers, and mixtures thereof.

22. A method for manufacturing a modular conveyor belt, comprising the steps of:
   a) molding a plurality of modules, each comprising a first plurality of link ends, a second plurality of link ends and an intermediate section integrally formed with and joining the first and second plurality of link ends, and including molding at least some of the modules of a polymeric material comprising a plurality of cells of an average cell size of less than about 100 microns and including associating a nucleating agent with the polymeric material to thereby provide the cells; and
   b) releasably engaging the link ends of each module between the link ends of an adjacent module except for individual link ends of modules disposed at the extreme sides of the belt by a pivot rod pivotally connecting the modules at engaged link ends to thereby form the modular conveyor belt.

23. The method of claim 22 including introducing a blowing agent into the polymeric material to provide the cells.

24. A method for manufacturing a modular conveyor belt, comprising the step of:
   a) molding a plurality of modules, each comprising a first plurality of link ends, a second plurality of link ends and an intermediate section integrally formed with and joining the first and second plurality of link ends;
   b) molding at least some of the modules from a polymeric material comprising a nucleating agent in an amount from about 2.5% to about 7%, by weight, of the polymeric material; and
   c) releasably engaging the link ends of each module between the link ends of an adjacent module except for individual link ends of modules disposed at the extreme sides of the belt by a pivot rod pivotally connecting the modules at engaged link ends to thereby form the modular conveyor belt.

25. The method of claim 24 including selecting the nucleating agent from the group consisting of talc, calcium carbonate, titanium oxide, barium sulfate, zinc sulfide, cellulosic fibers, and mixtures thereof.

26. The method of claim 24 including introducing a blowing agent into the polymeric material including the nucleating agent.

27. The method of claim 26 including providing the blowing agent as either a physical blowing agent or a chemical blowing agent.

28. The method of claim 27 including selecting the physical blowing agent from the group consisting of FREON R114, iso-pentane, n-pentane, trichlorofluoromethane, dichlorodifluoromethane, nitrogen, carbon dioxide, and mixtures thereof.

29. The method of claim 27 including selecting the chemical blowing agent from the group consisting of azodicarbonamide, azodiisobutyronitrile, p,p-oxibis, trihydrazinotriazine, barium-azodicarbonate, p-toluenesulfonyl semicarbazide, azobisisobutyronitrile, diazoaminobenzene, N,N'-dimethyl-N,N'-dinitrosoterephthalamide, N,N'-dinitrosopentamethylenetetramine, benzenesulfonyl hydrazide, toluene-(4)-sulfonyl hydrazide, benzene-1,3-disulfonyl hydrazide, diphenylsulfon-3,3'-disulfonyl hydrazide, 4,4'-oxybis(benzenesulfonyl hydrazide), and mixtures thereof.

30. The method of claim 26 including providing the blowing agent at about 0.1% to about 7%, by weight, of the polymeric material including the nucleating agent.

31. The method of claim 24 including subjecting the polymeric material including the nucleating agent to a pressure drop of greater than 1,000 psi as it is being injected into a mold for the module.

32. The method of claim 24 including subjecting the polymeric material including the nucleating agent to a pressure drop of greater than 3,000 psi as it is being injected into a mold for the module.

33. The method of claim 24 including subjecting the polymeric material including the nucleating agent to a pressure drop rate of about 0.5 GPa/s to about 10.0 GPa/s as it is being injected into mold for the module.

34. The method of claim 24 including providing the module as one selected from the group consisting of flat top modules, radius modules, flush grid modules, raised rib modules, and flight modules.

* * * * *